Nov. 3, 1959      G. A. WAHLMARK      2,910,845
CONSTANT VELOCITY JOINT
Filed April 25, 1957      4 Sheets-Sheet 1
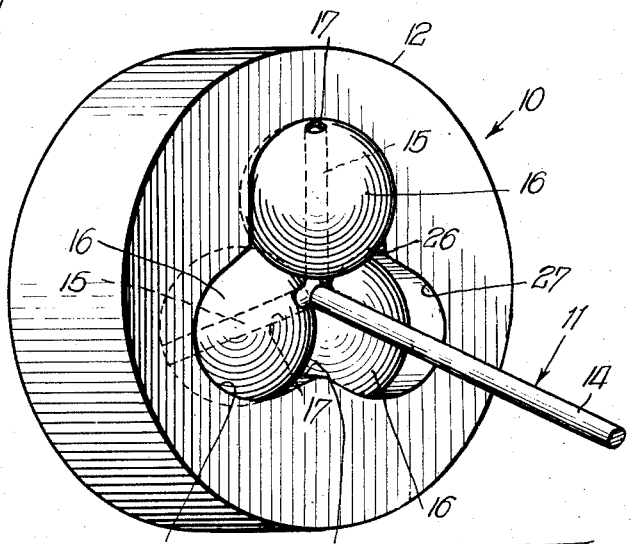
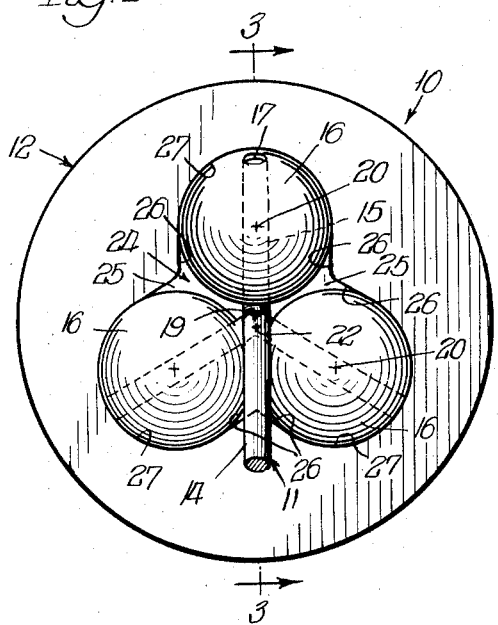
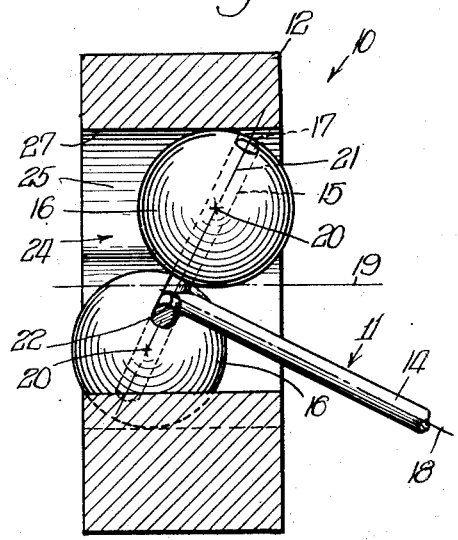
INVENTOR.
Gunnar A. Wahlmark,
BY Nov. 3, 1959  G. A. WAHLMARK  2,910,845
CONSTANT VELOCITY JOINT
Filed April 25, 1957  4 Sheets-Sheet 2
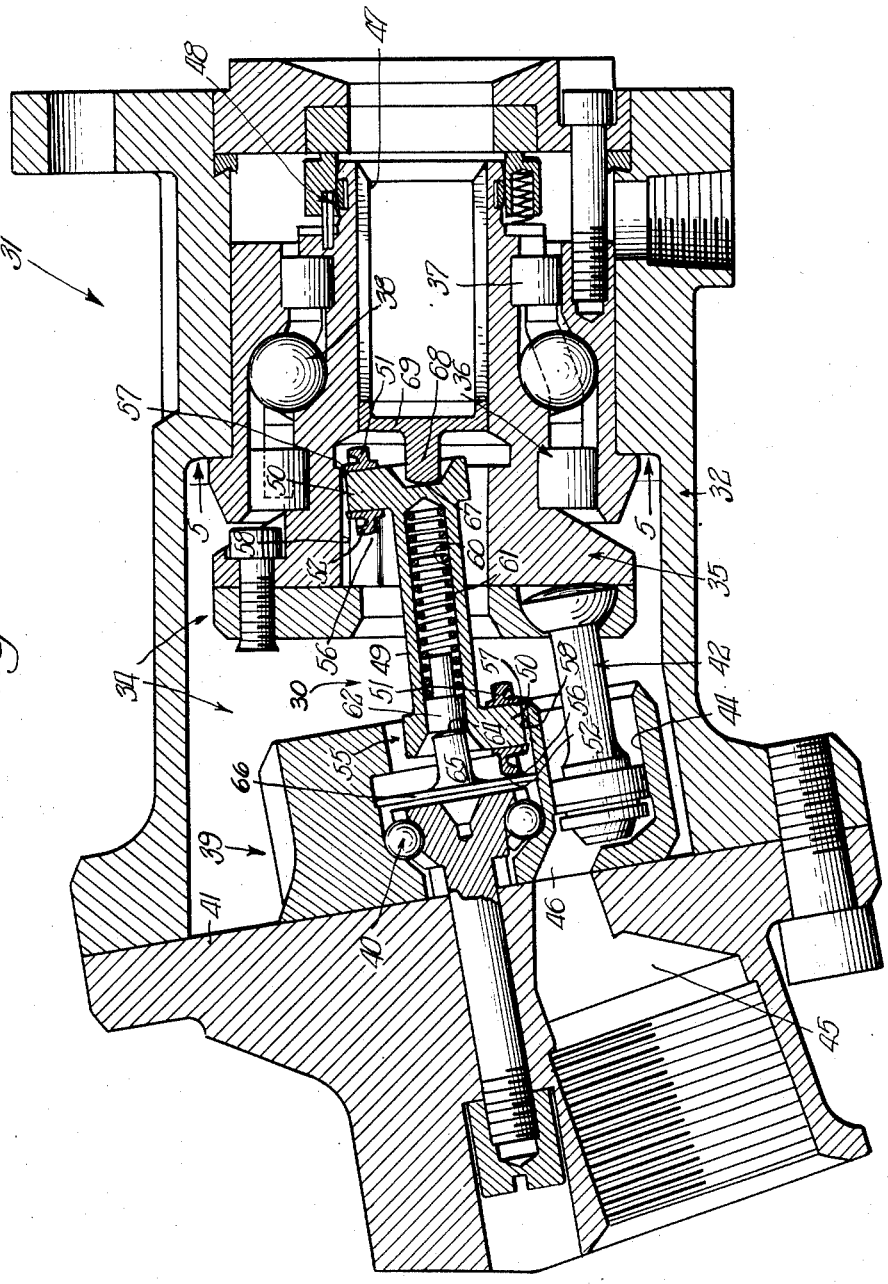
INVENTOR.
Gunnar A. Wahlmark,
BY
Byron, Hume, Groen & Clement
Attys.

Nov. 3, 1959    G. A. WAHLMARK    2,910,845
CONSTANT VELOCITY JOINT
Filed April 25, 1957    4 Sheets-Sheet 3
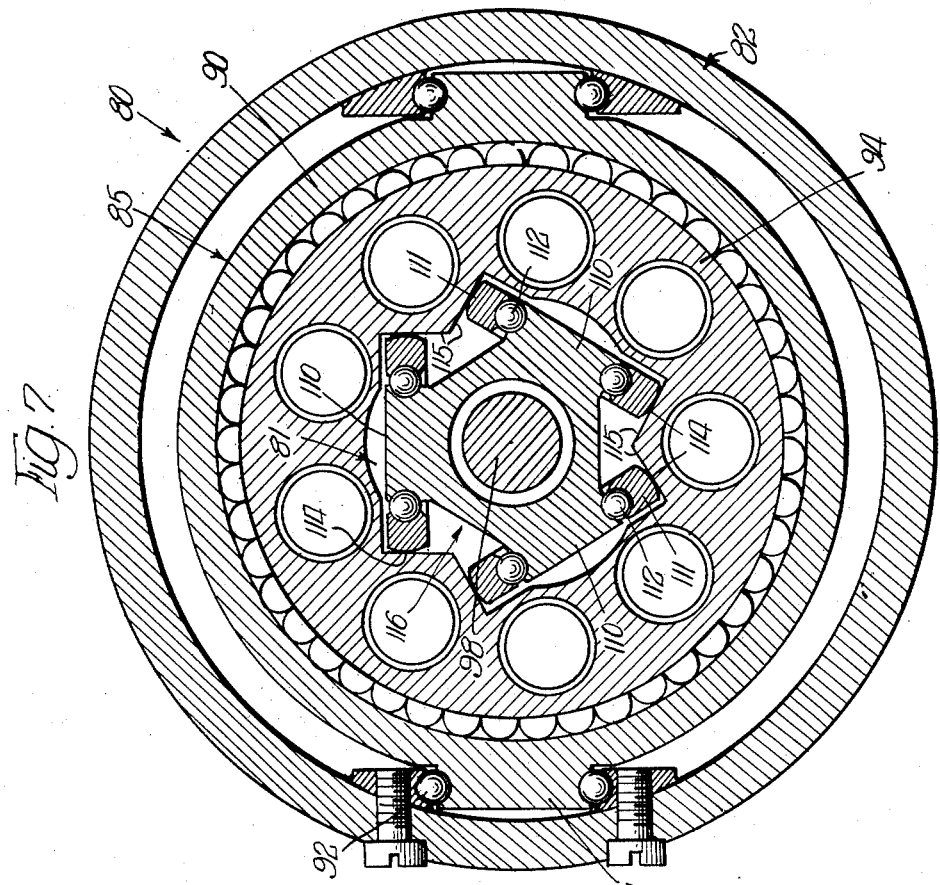
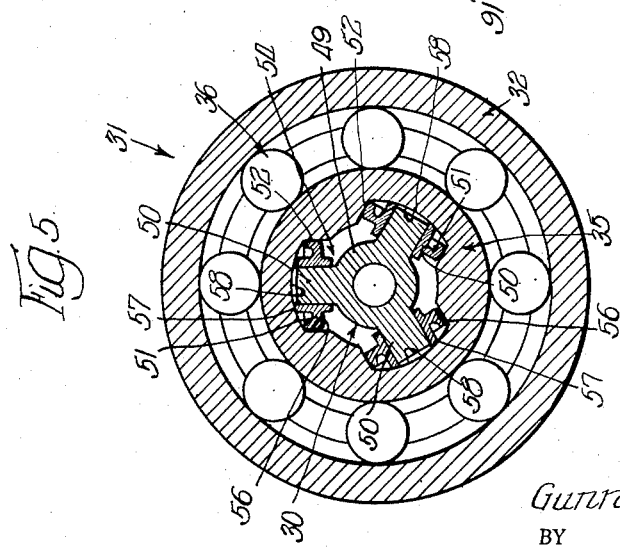
INVENTOR.
Gunnar A. Wahlmark,
BY

2,910,845

CONSTANT VELOCITY JOINT

Gunnar A. Wahlmark, Rockford, Ill.

Application April 25, 1957, Serial No. 655,072

10 Claims. (Cl. 64—21)

This invention relates to universal joints for connecting drive and driven members having angularly disposed axes. More particularly, the invention relates to universal joints embodying means for achieving constant velocity drive between the drive and driven members.

Until recently all commonly used universal joints were of the Cardan type embodying a spider having two pairs of trunnions formed at right angles with one pair pivotally connected to each of the shafts. It is commonly known that such conventional universal joints do not transmit uniform velocity from the drive shaft to the driven shaft but instead provide two accelerations and decelerations of speed of the driven shaft for each rotation of the drive shaft. While the average speed of rotation of the driven shaft is equal to that of the drive shaft, the periodic fluctuations in speed cause serious vibrational problems which increase drastically as the angularity between the shafts is increased. For example, the maximum speed variation with a conventional universal joint is approximately 3% at a 10° angularity between the shafts while at 30° angularity this variation jumps to approximately 29%.

In recent years various types of "constant velocity" universal joints have been devised in order to achieve a driven shaft speed which is at all times the same as the drive shaft speed. Most such constant velocity joints have utilized the principle of maintaining drive engagement between the shafts in a plane which is perpendicular to the plane defined by the axes of the shafts and which bisects the angle between the shafts. This plane is referred to as the "constant velocity plane." An example of a constant velocity joint of this type is embodied in my copending application Serial No. 611,842, filed September 25, 1956.

The present invention is the result of an effort to provide constant velocity drive between universally connected shafts without the necessity of providing means for maintaining the drive connection between the shafts in the "constant velocity plane."

It is an object of the present invention to provide an improved constant velocity universal joint.

Another object of the invention is to provide a constant velocity universal joint in which the drive connection between drive and driven members occurs in a plane perpendicular to the axis of one of the members.

A further object of the invention is to provide a constant velocity universal joint capable of accommodating substantial thrust between the drive and driven members.

Still another object of the invention is to provide a constant velocity universal joint in which friction is substantially reduced.

A still further object of the invention is to provide a constant velocity universal joint in which drive elements universally connecting the shafts are carried by one shaft and are maintained at a constant distance from the axis of the other shaft.

An additional object of the invention is to provide a constant velocity universal joint in which the drive between the universally connected members is provided through spherically surfaced drive elements, the centers of which are disposed in a plane perpendicular to the axis of one of the members.

Another object is to provide a constant velocity universal joint which is free from backlash.

A further object is to provide a constant velocity universal joint utilizing three drive elements to equally distribute the driving force.

An important object is to provide a constant velocity universal joint capable of driving at extreme angle with low friction.

Other objects, features and advantages will be apparent from the following detailed description taken in conjunction with the accompanying drawings, in which:

Figure 1 is a perspective view of a schematically illustrated constant velocity joint according to the present invention;

Figure 2 is an end elevational view of the universal joint shown in Figure 1;

Figure 3 is a sectional view taken along the line 3—3 of Figure 2;

Figure 4 is a longitudinal sectional view of another joint according to the present invention utilized in a swash plate hydraulic device;

Figure 5 is a fragmentary sectional view taken along line 5—5 of Figure 4, but showing the axes of the drive and driven members of the joint aligned;

Figure 7 is a sectional view taken along line 7—7 of Figure 6, but showing the drive and driven members axially aligned.

Figure 6:
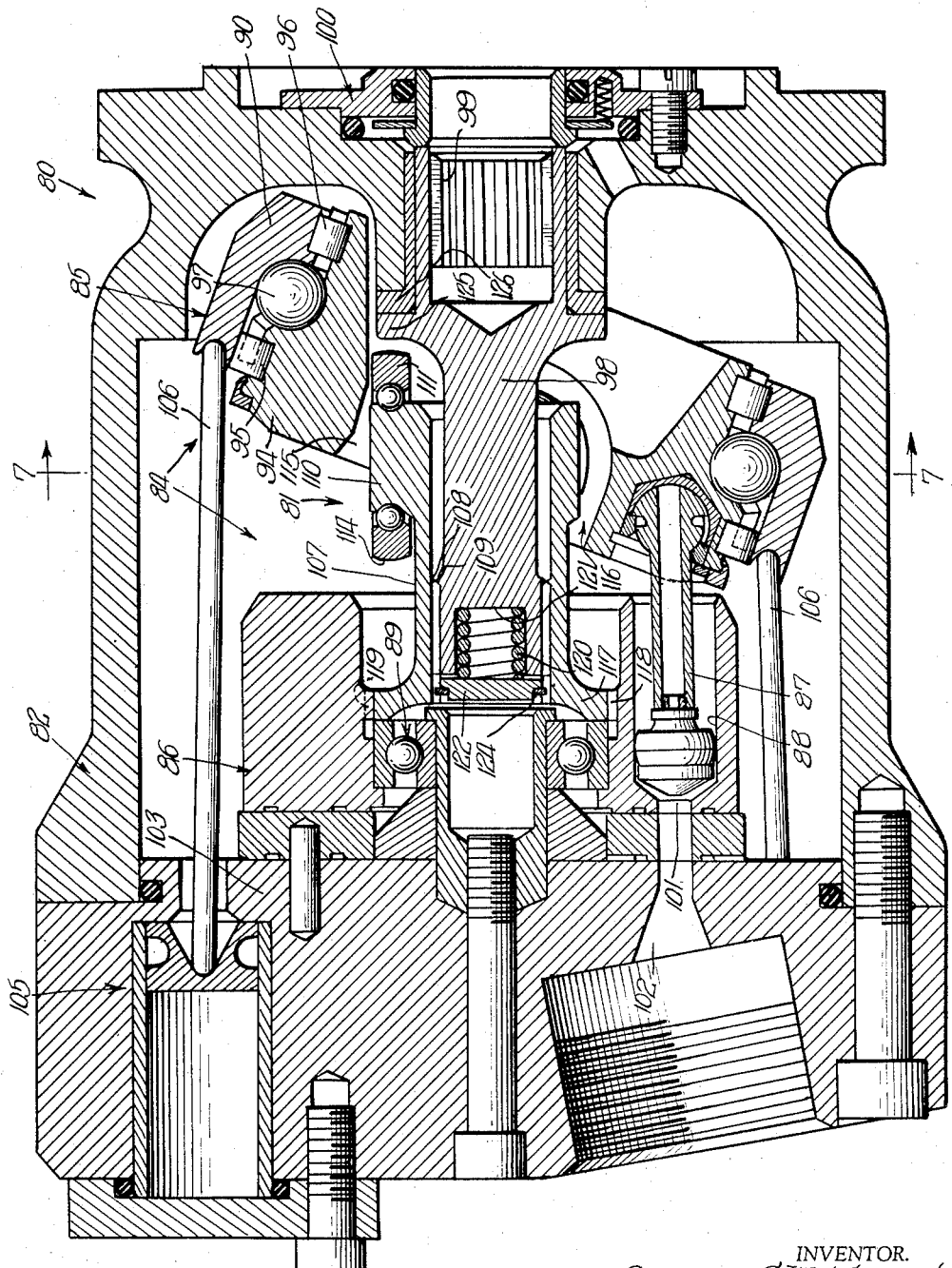
Figure 6 is a longitudinal sectional view of a third form of constant velocity joint according to the present invention illustrated as used in connection with another swash plate hydraulic device.

The constant velocity universal joint of Figures 1–3 is more or less schematically illustrated and is generally designated by the reference numeral 10. The joint includes a drive member 11 and a driven member 12, a designation chosen for simplicity of explanation only inasmuch as the drive may just as readily take place from member 12 to member 11.

The drive member 11 includes a shaft portion 14 which is provided at one end with three pivot journals or trunnions 15 which rotatably and shiftably carry three drive elements 16. The pivot journals 15 are fixedly secured to the end of the shaft and are equiangularly spaced in a plane which is perpendicular to the shaft 14, so that the pivots collectively define a drive "spider." The drive elements 16 are spherically surfaced and are provided with diametrical bores 17 which slidably receive the pivots 15 in close fitting relation.

As illustrated in Figures 2 and 3, the drive member 11 is rotatable about an axis 18 which is disposed at an acute angle with respect to the axis of rotation 19 of the driven member 12. The centers of the spherical drive members 16 are designated by the reference numerals 20, and these centers define a plane, designated by the reference numeral 21 (Figure 3), which is perpendicular to the axis 18 of the drive member. The point of intersection of the axis 18 with the plane 21 defines the center of the spider and is designated by the reference numeral 22.

The driven member 12 may be of any suitable construction and herein is shown in the form of a circular plate having a centrally disposed drive recess 24 which is formed of three equiangularly spaced radial drive channels 25. The sides of each of the drive channels are defined by a pair of parallel drive surfaces 26, which in turn are parallel to the axis 19 of the driven member 12. The respective pairs of surfaces 26 are equally spaced on opposite sides of the axis. The outer ends of the channels 25 are defined by cylindrical surfaces 27 which are equally spaced from the axis 19. The drive surfaces 26 are spaced so that they snugly but rotatably receive the drive elements 16 of the drive member 11.

When the drive member 11 is rotated about its axis 18, the driven member 12 is correspondingly rotated, through the spider pivots 15, the drive elements 16, and the drive surfaces 26. Due to centrifugal force generated during rotation, the drive elements 16 are held outwardly against the cylindrical surfaces 27, so that the centers 20 of the drive elements are always equidistant from the axis 19 of the driven member 12. If the drive member 11 is rotated at a constant angular velocity, then the driven member 12 will be correspondingly driven at exactly the same constant angular velocity. This is because the points of contact between the spherical surfaces of the drive elements 16 with the flat drive surfaces 26 are always maintained equidistant from the axis 19 of the driven member regardless of the angularity between the axes 18 and 19.

Since the spherical drive elements 16 are maintained radially outwardly by centrifugal force, the center 22 of the spider must shift with respect to the axis 19 of the driven member as the joint is rotated. When the joint utilizes three drive elements as illustrated in Figures 1–3, the center 22 of the spider must shift its position 180° with respect to the axis 19 of the driven member for every 60° rotation of the drive member, and the center of the spider is always shifted away from the drive element whose center 20 is in the plane defined by the axes 18 and 19, or is closest to this plane. This is illustrated in Figure 3 which shows the spider center 22 shifted downwardly with respect to the axis 19 of the driven member, away from the upper spherical drive element 16 whose center 20 at this instant is in the plane defined by the axes 18 and 19. Actually, the magnitude of spider center shift is very slight for practical drive angles but is emphasized in the figures for the sake of clarity. The spider center makes three complete 360° shifts with respect to the driven member axis 19 with each complete 360° rotation of the joint. This means that the axis 18 must change its angularity very slightly with respect to the axis 19 as the joint rotates. However, since the shifting of the center is very slight, the change in angularity can be readily accommodated through flexing of the shaft 14, if a long shaft is utilized, or in slight angular play in the joint connecting the shaft 14 to its driving member (not shown).

The principles of the joint illustrated in Figures 1–3 are applicable for constructing a universal joint for operation at all rotational velocities, from very low velocities just sufficient to produce the desired centrifugal force effect on the drive elements, up to extremely high rotational velocities in the neighborhood of 20,000 to 30,000 r.p.m. or even higher.

If desired, the joint of Figures 1–3 can be simplified even further for low speed applications by fixedly securing the spherical drive element 16 on the spider pivots 15, or by eliminating the spider pivots and fixedly securing the drive elements at the end of the shaft 14 and to each other. If the joint is constructed in this manner, it will operate in exactly the same way except that the drive element whose center is closest to or in the plane determined by the axes of the joint will not bear against the outward end of its channel 25, so that the point of contact between this drive element and the driven member will be slightly closer to the axis 19. Thus, the rotational velocity of the driven member 12 will not be absolutely constant, but since the center shift is so slight, the very small accelerations and decelerations of the driven member which theoretically result will be so small as to be negligible, particularly at joint angles of 30° or less. For all practical intents and purposes, then, a joint constructed in this manner can also be considered a constant velocity joint.

In Figures 4 and 5 a constant velocity joint 30, constructed in accordance with the present invention, is embodied in a swash plate type hydraulic device generally designated by the reference numeral 31. The swash plate device 31 is of fixed displacement and may be operated either as a pump or as a motor and includes a stationary casing 32 having swash plate hydraulic mechanism 34 rotatably mounted therein. The mechanism 34 includes a drive or swash plate assembly 35, which is rotatably mounted in the casing on antifriction roller bearings 36 and 37 and antifriction ball thrust bearings 38, and a driven or piston block assembly 39, which is rotatably mounted on antifriction ball bearings 40. The piston block assembly bears against an angularly disposed face plate 41, which provides an end closure for the housing 32.

The swash plate assembly 35 and the cylinder block assembly 39 are connected for cocurrent rotation by means of the constant velocity joint 30, to be described in detail later, to cause reciprocation of a plurality of pistons 42 (one of which is shown). The pistons are universally secured to the swash plate assembly 35 and the piston heads reciprocate in cylinders 44 which communicate with hydraulic inlet and outlet ports 45 (one shown) through piston ports 46. The port 45 which is shown can be either the inlet port or the exhaust port, depending upon whether the hydraulic device 31 is being operated as a motor or a pump. The contacting surfaces between the face plate 41 and the cylinder block 39 are referred to as the "face valve," which controls communication between the various cylinder ports 46 and the inlet and exhaust ports in the face plate as the cylinder block assembly rotates.

For providing a mechanical power input connection, or output connection (depending upon whether the hydraulic device is utilized as a pump or a motor), the swash plate assembly has internal splines 47 for connection with a drive or driven shaft (not shown). In order to prevent leakage between the rotating swash plate assembly 35 and the stationary casing 32 a rotating seal assembly 48 of any suitable construction is provided.

The constant velocity universal joint 30 includes a drive unit 49 having at each end a drive spider having three radially disposed, equiangularly spaced pivot trunnions or journals 50. It will be noted that the trunnions at one end of the drive unit are rotated 60° relative to the trunnions at the other end in order that the slight center shifting of each spider be exactly 180° out of phase to reduce or eliminate vibration during rotation of the swash plate mechanism.

On each of the trunnion pivots 50 a drive element or drive roller 51 is rotatably mounted, and each of the drive elements is formed with an annular segmental spherical surface 52 centered on the axis of the respective pivot trunnion. The rollers 51 at one end of the drive unit 49 are disposed in an axially disposed drive recess 54 formed within the swash plate assembly 35, and the rollers 51 at the other end of the drive unit are disposed in an axially disposed drive recess 55 formed within the cylinder block assembly 39.

In a manner similar to the drive recess 24 of the embodiment of Figures 1–3, the drive recesses 54 and 55 are each provided with radially disposed channels having respective pairs of parallel drive surfaces 56 which engage the segmental spherical surfaces 52 of the rollers. The outward end surfaces of the rollers are provided with segmental spherical surfaces 57 which engage segmental cylindrical surfaces 58 of equivalent diameter defining the ends of each of the drive channels of the drive recesses 54 and 55. The segmental cylindrical surfaces 58 are equidistant from the axes of the swash plate assembly 35 and the cylinder block assembly 39, respectively, and for convenience the cylindrical surfaces are centered on the respective axes of the rotatable assemblies 35 and 39. The trunnion pivots 50 end short of the cylindrical surfaces 53 to allow clearance for assembly and operation.

In order to properly locate the drive unit 49 of the constant velocity joint 30, and, in addition, to provide a desired preload on the face valve, the stem of the drive unit has an axial bore 60 which is open toward the cylinder block assembly 39 and contains a light compression spring 61 bottomed on the blind end of the bore. A shiftable stud 62 is seated on the free end of the spring 61, adjacent the open end of the bore 60, and engages a spherically or conically ground end 64 of a central post portion 65 of a seat element 66. The opposite recessed end of the drive unit 49 engages a spherically or conically ground end surface 67 of a central post 68 of another seat member 69. The seat member 69 is fixedly secured at the inner end of the splines 47 within the socket block assembly 35.

The resilient force exerted by the spring 61 resiliently positions the drive unit 49 against the seat element 69, thus eliminating all end clearance and preventing any possibility of chatter during operation. The resilient force exerted against the cylinder block assembly 39 through the seat element 66 is resisted by the face plate 41 to provide a resilient preload in the face valve, to control the pressure between the valve faces and to control leakage. The resilient preload on the face valve faces is very important and must be properly balanced since excessive spring force will result in excessive wear in the face valve while inadequate spring force will permit excessive leakage. The provision of the locating spring 61 also makes the unit easier to machine and to assemble since otherwise close tolerances would be required to properly locate the drive unit 49.

The swash plate mechanism shown in Figures 4 and 5 operates in the manner described in detail in my copending applications Serial No. 583,797, filed May 9, 1956, and Serial No. 611,842, filed September 25, 1956, and thus the operation need not be described in detail here. The particular construction illustrated has a fixed swash plate tilt resulting in fixed displacement providing a capacity of eight gallons per minute at 24,000 r.p.m.

In the device illustrated in Figures 4 and 5 the constant velocity universal joint 30 does not carry full torque between the swash plate assembly 35 and the cylinder block assembly 39 but is provided to coordinate rotation of these two assemblies against frictional forces, or, in other words, to properly "time" the rotation. When the mechanism is rotated at operational speed, centrifugal force keeps the drive rollers 51 out against the segmental cylindrical surfaces 58, so that the centers of the segmental spherical surfaces 52 are maintained equidistant from the respective axes of the swash plate assembly 35 and the cylinder block assembly 39. Consequently, the points of engagement with the drive surfaces 56 are always equidistant from the rotational axes and absolutely constant velocity drive is achieved between the two assemblies. Inasmuch as the constant velocity joint 30 is double ended (i.e. is provided with drive rollers at both ends), there is no need to provide for shaft flexibility or limited angular play as was the case with the embodiment of Figures 1–3. The very slight shifting of the centers of the two spiders of the drive unit 49, results in a "weaving" of the drive unit, but this slight weaving has no adverse effect on the operation of the joint, even at the extremely high rotational speeds involved.

The spring 61 and its associated elements resiliently position the spider to prevent chattering or displacement and at the same time to provide an advantageous resilient preload between the engaging faces of the face valve. In the particular embodiment illustrated the spring 61 is designed to exert a force between 5 and 10 pounds. Of course, the force exerted varies for different designs but is always of relatively low magnitude.

In Figures 6 and 7 a third embodiment of constant velocity universal joint according to the present invention is shown utilized in a swash plate hydraulic device, generally designated by the reference numeral 80. The joint of this embodiment is designated by the reference numeral 81.

The swash plate hydraulic device 80 includes a casing 82 housing variable displacement swash plate hydraulic mechanism 84, which can be utilized as a hydraulic pump or a hydraulic motor. The hydraulic mechanism 84 includes a tiltable swash plate assembly 85 and a cylinder block assembly 86. A plurality of pistons 87 (one shown) are universally secured to the swash plate assembly and have piston head portions reciprocably disposed in piston cylinders 88 formed in the cylinder block assembly. The cylinder block assembly is rotatably mounted in the casing by means of an antifriction ball bearing assembly 89. The swash plate assembly 85 includes an outer control or tilt ring 90 which is pivotally mounted on a pair of trunnions 91 which are rotatably secured to the casing 82 through antifriction ball bearings 92. A piston socket ring 94 is rotatably mounted within the tilt ring 90 by means of antifriction roller bearings 95 and 96 and antifriction ball thrust bearings 97. The ends of the pistons 87 opposite the heads are universally secured to the socket ring 94.

Mechanical power output or input is achieved through an internal shaft 98 having internal splines 99 at one end for receiving mating splines on a connecting shaft (not shown). A suitable rotating seal assembly 100 is provided at the juncture between the end of the internal shaft 98 and the casing.

Flow of hydraulic fluid to or from the cylinders 88 is accomplished through cylinder ports 101 which connect with hydraulic pressure and exhaust ports 102 (one of which is shown) formed in a stationary face plate 103. A wear plate 104 is secured to the face plate 103, and the abutting surfaces of the cylinder block assembly 86 and the wear plate 104 provide a face valve.

For controlling the tilt of the swash plate assembly 85, suitable control mechanism 105 is provided, including a pair of control rods 106 which engage the tilt ring 90 to change the angle of tilt of the swash plate assembly and consequently the capacity of the hydraulic mechanism.

The constant velocity universal joint 81 provides a driving connection between the socket ring 94 and the internal shaft 98. The joint includes a hollow drive unit 107 having internal splines 108 which are engaged by external splines 109 formed at the inner end of the internal shaft 98. The splines are constructed so that there is no rotational play, but a slight amount of angular play is permitted to accommodate slight shifting of the axis of the drive unit during rotation of the joint.

At its other end the drive unit 107 includes three pivot trunnions or journals 110, which are radially disposed and equiangularly spaced in the manner described in connection with the pivots of the previous embodiments, providing a drive spider. A drive member 111 is rotatably disposed on each of the pivots 110 by means of antifriction ball bearings 112. The drive elements 111 are provided with segmental spherical surfaces 114 which are disposed in close fitting relation between respective pairs of parallel drive surfaces 115 defining three short, radially extending, equiangularly spaced drive channels of a drive recess 116 axially formed within the socket ring 94. The spherical surfaces 114 are centered on the axes of the respective trunnions 110.

The opposite end of the drive unit 107 is provided with a radial flange 117 having external splines 118 engaging mating internal splines 119 formed within the cylinder block assembly 86 adjacent the antifriction bearing 89.

Means are provided for resiliently locating the spider 107 while at the same time maintaining a desired preload on the face valve. For this purpose a coil compression spring 120 is disposed in an axial bore 121 formed in the inner end portion of the internal shaft 98. The spring 120 is bottomed at the blind end of the bore and resiliently bears at its other end against a spring seat member 122, which is secured within the inner end of the drive unit 107 by means of a snap ring 124. The internal shaft 98 is provided with an annular flange 125 which bears against the end of a plain bearing 126 secured within the end of the housing 82, so that the spring 120 resiliently urges the drive unit 107 toward the left, as illustrated in Figure 6, to position the flange 117 against the outer race of the antifriction bearing 89. The bearing, in turn, urges the cylinder block assembly 86 against the wear plate 104 of the face valve to produce the desired resilient preload on the face valve.

When the hydraulic mechanism is utilized as a pump, the socket ring 94 and the cylinder block assembly 86 are rotated causing reciprocation of the pistons to pump hydraulic liquid in accordance with the speed of rotation and the angle of tilt of the swash plate assembly. If the device is being utilized as a motor, liquid under pressure is selectively introduced into the piston cylinders ahead of the piston heads to cause reciprocation of the pistons and to thereby cause rotation of the swash plate assembly, so that the internal shaft 98 is rotated through the joint 81. For a more detailed explanation of the operation of hydraulic mechanism of this type, reference is made to my prior copending applications Serial No. 583,797, filed May 9, 1956, and Serial No. 611,842, filed September 25, 1956.

The constant velocity joint 81 operates in much the same manner as the joints of the previous embodiments except that the drive elements 111 are not moved outwardly by centrifugal force inasmuch as they are retained in their rotatable position by the antifriction bearings 112. Thus, as the hydraulic mechanism operates with the swash plate assembly tilted, the center of the spider of the drive unit shifts slightly and carries with it the drive elements 111. This produces a very slight shifting of the points of contact of the drive elements with the drive surfaces during rotation of the joint, so that, theoretically at least, slight fluctuations in velocity occur between the spider and the socket ring 94. However, the theoretical fluctuations in velocity are so slight that they have no adverse effect, and for all practical purposes the joint transmits true constant velocity, particularly when the segmental spherical surfaces 114 are of relatively large diameter as illustrated in Figures 6 and 7. The very slight weaving of the axis of the spider 107 is accommodated in the slight angular play permitted between the splines 108 and 109. Actual construction and operation of a device such as shown in this embodiment has effectively illustrated that the theoretical velocity variations are, in fact negligible, so that the joint transmits constant velocity from a practical standpoint. Because of the arrangement of the parts in the embodiments of Figures 6 and 7, the constant velocity joint 81 carries full torque.

In all of the embodiments described it is advantageous to use three driving elements as described, because the three elements find their own centers under load and thus the driving effort is evenly distributed between the three regardless of minor errors in indexing and machining. However, it will be understood that a larger number can be used, if desired, as long as the parts are accurately constructed. It is also possible to use only two driving elements but in doing so means must be provided to assist in stabilizing and centering the drive unit spider.

The joints of this invention are practically free from backlash because the drive elements can be fitted in the drive channels with practically no clearance due to the fact that the drive effort is achieved through rolling contact. The provision of parallel flat surfaces in the drive channels makes for easy machining, and the spherical surfaces of the drive elements readily roll on the flat drive surfaces. The joints are particularly well adapted for high speed operation, and they can be used for extreme drive angles with low friction.

It will be readily understood that the constant velocity universal joints of the present invention can be utilized in any type of mechanical device, requiring angular drive. However, they are particularly well adapted for use in swash plate hydraulic devices.

Variations and modifications may be effected without departing from the scope of the novel concepts of the present invention.

I claim:

1. A constant velocity universal joint comprising a drive member, a driven member, a plurality of drive elements secured to one of said members defining a plane perpendicular to the axis of said one member, a plurality of drive channels formed in the other of said members, each of said channels having a pair of parallel surfaces engaging the respective drive elements on opposite sides thereof, means for maintaining said drive elements equidistant from the axis of said other member when said joint is rotated, and means accommodating weaving of the axis of said one member relative to the axis of the other member when said joint is rotating with the axes of the members angularly disposed.

2. A constant velocity universal joint comprising a drive member, a driven member, a plurality of drive elements secured to one of said members, drive surfaces on the other of said members in driving engagement with said drive elements, means for maintaining said drive elements equidistant from the axis of said other member when said joint is rotated, and means accommodating weaving of the axis of said one member relative to the axis of the other member when said joint is rotating with the axes of the members angularly disposed.

3. A constant velocity universal joint according to claim 2 wherein said drive elements are three in number.

4. A constant velocity universal joint comprising a drive member, a driven member, a plurality of drive elements secured to one of said members for rotation about and shifting along axes which are equiangularly spaced and intersect the axis of said one member at a given point, said drive elements having spherical surfaces about their axes of rotation, a plurality of parallel pairs of drive surfaces formed on the other of said members parallel to the axis of said other member, the drive surfaces of each pair engaging the spherical surfaces of the respective drive elements in close fitting relation on opposite sides of each drive element, means on said other member for restraining outward shifting of said drive elements under influence of centrifugal force to maintain the drive elements equidistant from the axis of rotation of said other member, and means accommodating shifting of said given point relative to the axis of said other member when said joint is rotated with the axes of the members angularly disposed.

5. A constant velocity universal joint comprising a drive member, a driven member, a plurality of drive rollers rotatably and axially shiftably secured to one of said members, said drive rollers having annular spherical surfaces with their centers on the axes of rotation of the rollers, the axes of rotation of the rollers being perpendicular to and engaging the axis of said one member at a given point, and a drive recess formed in the other of said members including a plurality of drive channels equiangularly spaced about the axis of said other member and having side surfaces in close fitting engagement with the spherical surfaces on said drive rollers, said channels having end stop surfaces equidistant from the axis of said other member, said stop surfaces being spaced radially outwardly from the adjacent portions of said one member, and said rollers having segmental spherical end surfaces adapted for engaging the stop surfaces of said channels, whereby said rollers are urged radially outwardly under the influence of centrifugal force so that said spherical end surfaces engage said stop surfaces to maintain the centers of said annular spherical surfaces equidistant from the axis of said other member, and whereby the spacing between said stop surfaces and said one member accommodates weaving of the axis of said one member relative to the axis of said other member when said joint is rotated with the axes of the members angularly disposed.

6. A constant velocity universal joint comprising a drive member, a driven member, a drive unit disposed between said members, a spider secured at each end of said drive unit, each of said spiders having a plurality of trunnions with axes equiangularly disposed in a plane perpendicular to said drive unit, a spherically surfaced drive element rotatably mounted on each of the respective trunnions, an axial drive recess formed in each of said members, each of said drive recesses having a plurality of pairs of parallel drive surfaces disposed parallel to the axes of the respective trunnions and to the axes of the respective members and engaging the spherical surfaces on the respective drive elements in close fitting relation, and means for maintaining the respective drive elements equidistant from the axes of the respective members, the outward ends of said trunnions being spaced from adjacent portions of said members to accommodate weaving of the drive unit relative to said members when said joint is rotated with the axes of the members angularly disposed.

7. A constant velocity universal joint according to claim 6 wherein each of said spiders has three trunnions.

8. A constant velocity universal joint comprising a drive member, a driven member, a drive unit disposed between said members, a plurality of drive rollers rotatably and axially shiftably secured at each end of said drive unit on axes which are equiangularly spaced and intersect the axis of said drive unit at respective points, said drive rollers having annular segmental spherical surfaces about their axes of rotation and segmental spherical end surfaces, and a drive recess formed in each of said members, each of said drive recesses including a plurality of drive channels equiangularly spaced about the axes of the respective members and having side surfaces in close fitting engagement with the annular spherical surfaces on said drive rollers, said channels having end stop surfaces equidistant from the axes of the respective members and spaced outwardly from adjacent portions of said drive unit, whereby said rollers are movable radially outwardly under the influence of centrifugal force to engage said spherical end surfaces against said stop surfaces to maintain the centers of said annular spherical surfaces equidistant from the axes of the respective members and whereby the outward spacing of said stop surfaces accommodates weaving of said drive unit relative to said members when said joint is rotated with the axes of the members angularly disposed.

9. A constant velocity universal joint comprising a drive member, a driven member, a drive unit disposed between said members, means drivingly connecting said drive unit with one of said members, a plurality of drive elements secured to said drive unit, said drive elements having spherical surfaces the centers of which are disposed in a plane perpendicular to the axis of said drive unit, a drive recess axially formed in the other of said members and having a plurality of radially extending channels receiving said drive elements in close fitting relation with said spherical surfaces, a first positive stop engaging one end of said drive unit, said drive unit having a blind axial bore open at the other end thereof, a compression spring disposed in said bore and bottomed on the blind end thereof, a shiftable stud seated on the other end of said spring, and a second positive stop engaging said shiftable stud, whereby said spring resiliently positions said drive unit against said first positive stop.

10. A constant velocity universal joint according to claim 6 wherein the trunnions of one of said spiders are equiangularly spaced with respect to the respective trunnions of the other of said spiders.

References Cited in the file of this patent
UNITED STATES PATENTS

| | | |
|---|---|---|
| 2,125,615 | Kittredge | Aug. 2, 1938 |
| 2,155,455 | Thoma | Apr. 25, 1939 |
| 2,532,433 | Wingquist | Dec. 5, 1950 |
| 2,691,876 | Wildhaber | Oct. 9, 1954 |
| 2,709,902 | Wildhaber | June 7, 1955 |